(12) United States Patent
Gruby et al.

(10) Patent No.: US 7,088,578 B1
(45) Date of Patent: Aug. 8, 2006

(54) PERSONAL DIGITAL ASSISTANT PROTECTION SYSTEM

(76) Inventors: Raymond S. Gruby, 2520 Domino Dr., Bismarck, ND (US) 58503-0825; Trevor S. Gruby, 4429 Impatiens Ave. North, Brooklyn Park, MN (US) 55443

( * ) Notice: Subject to any disclaimer, the term of this patent is extended or adjusted under 35 U.S.C. 154(b) by 0 days.

(21) Appl. No.: 10/982,579

(22) Filed: Nov. 5, 2004

(51) Int. Cl.
*G06F 1/16* (2006.01)
*H05K 5/02* (2006.01)

(52) U.S. Cl. .................. 361/684; 312/216; 710/303

(58) Field of Classification Search ........ 361/679–687, 361/724–727; 312/223.1–223.6, 216; 710/303, 710/73; 439/638; 360/97.01, 98.01
See application file for complete search history.

(56) References Cited

U.S. PATENT DOCUMENTS

| | | | |
|---|---|---|---|
| 5,822,546 A | 10/1998 | George | 395/281 |
| 6,000,665 A | 12/1999 | Clementson et al. | 248/118 |
| 6,302,563 B1 | 10/2001 | Yama | 362/253 |
| 6,392,882 B1* | 5/2002 | Chen et al. | 361/686 |
| 6,498,720 B1 | 12/2002 | Glad | 361/680 |
| 6,577,496 B1 | 6/2003 | Gioscia et al. | 361/681 |
| 6,646,866 B1* | 11/2003 | Kao | 361/683 |
| 6,672,622 B1 | 1/2004 | Barron | 281/44 |
| 6,726,070 B1 | 4/2004 | Lautner | 224/221 |
| 2001/0040561 A1 | 11/2001 | Weinzierl et al. | 345/169 |
| 2002/0109961 A1 | 8/2002 | Glad | 700/275 |
| 2003/0006998 A1 | 1/2003 | Kumar | 345/700 |
| 2003/0022109 A1 | 1/2003 | Kobayashi | 430/311 |
| 2003/0041206 A1 | 2/2003 | Dickie | 710/303 |
| 2003/0150756 A1 | 8/2003 | Kajiya | 206/320 |
| 2003/0184958 A1 | 10/2003 | Kao | 361/683 |
| 2004/0001305 A1 | 1/2004 | Chuang et al. | 361/683 |
| 2004/0019724 A1 | 1/2004 | Singleton, Jr. et al. | 710/303 |
| 2004/0080899 A1* | 4/2004 | Hill et al. | 361/680 |
| 2004/0112143 A1 | 6/2004 | Richardson | 73/856 |

OTHER PUBLICATIONS

Eldon Durable Storage Clipboard, Office Depot.com, Website Printout, Jul. 8, 2004, 1 Page.
IR Sensors, Pololu.com, Website Printout, Jul. 15, 2004, 2 Pages.
The Satellite, Pda-concepts.com, Website Printout, Jul. 13, 2004, 11 Pages.

* cited by examiner

*Primary Examiner*—Hung Van Duong
(74) *Attorney, Agent, or Firm*—Michael S. Neustel

(57) ABSTRACT

A personal digital assistant protection system for protecting a PDA along with receiving various PDA accessories. The personal digital assistant protection system includes a housing with an upper opening within an upper surface, and a tray removably positionable within the housing. The tray includes a support member that supports a PDA in a manner aligned with the upper opening when the tray is positioned within the housing. An auxiliary power source and other items may positioned within the tray.

20 Claims, 7 Drawing Sheets

PERSONAL DIGITAL ASSISTANT PROTECTION SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to personal digital assistant cases and more specifically it relates to a personal digital assistant protection system for protecting a PDA along with receiving various PDA accessories.

2. Description of the Related Art

Personal digital assistant (PDA) cases have been in use for years. Conventional PDA cases are comprised of either a soft pocket structure or a rigid pivoting structure. However, conventional PDA cases do not provide enough room to include larger accessories such as a battery, antenna and other accessories. Since a conventional battery for a PDA using wireless communications has a relatively short operating time, the users of wireless PDAs must frequently replace and recharge their batteries. Also, conventional PDA cases do not provide a writing surface for a user to write upon.

While these devices may be suitable for the particular purpose to which they address, they are not as suitable for protecting a PDA along with receiving various PDA accessories. Conventional PDA cases are comprised of small and compact structures that are not suitable for receiving larger accessories.

In these respects, the personal digital assistant protection system according to the present invention substantially departs from the conventional concepts and designs of the prior art, and in so doing provides an apparatus primarily developed for the purpose of protecting a PDA along with receiving various PDA accessories.

BRIEF SUMMARY OF THE INVENTION

In view of the foregoing disadvantages inherent in the known types of PDA cases now present in the prior art, the present invention provides a new personal digital assistant protection system construction wherein the same can be utilized for protecting a PDA along with receiving various PDA accessories.

The general purpose of the present invention, which will be described subsequently in greater detail, is to provide a new personal digital assistant protection system that has many of the advantages of the PDA cases mentioned heretofore and many novel features that result in a new personal digital assistant protection system which is not anticipated, rendered obvious, suggested, or even implied by any of the prior art PDA cases, either alone or in any combination thereof.

To attain this, the present invention generally comprises a housing with an upper opening within an upper surface, and a tray removably positionable within the housing. The tray includes a support member that supports a PDA in a manner aligned with the upper opening when the tray is positioned within the housing. An auxiliary power source and other items may positioned within the tray.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a personal digital assistant protection system that will overcome the shortcomings of the prior art devices.

A second object is to provide a personal digital assistant protection system for protecting a PDA along with receiving various PDA accessories.

Another object is to provide a personal digital assistant protection system that allows for the usage of an auxiliary power source for providing extended operating time for the PDA.

An additional object is to provide a personal digital assistant protection system that protects the PDA from damage.

A further object is to provide a personal digital assistant protection system that provides a writing surface.

Another object is to provide a personal digital assistant protection system that is capable of receiving and protecting various types of PDAs.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
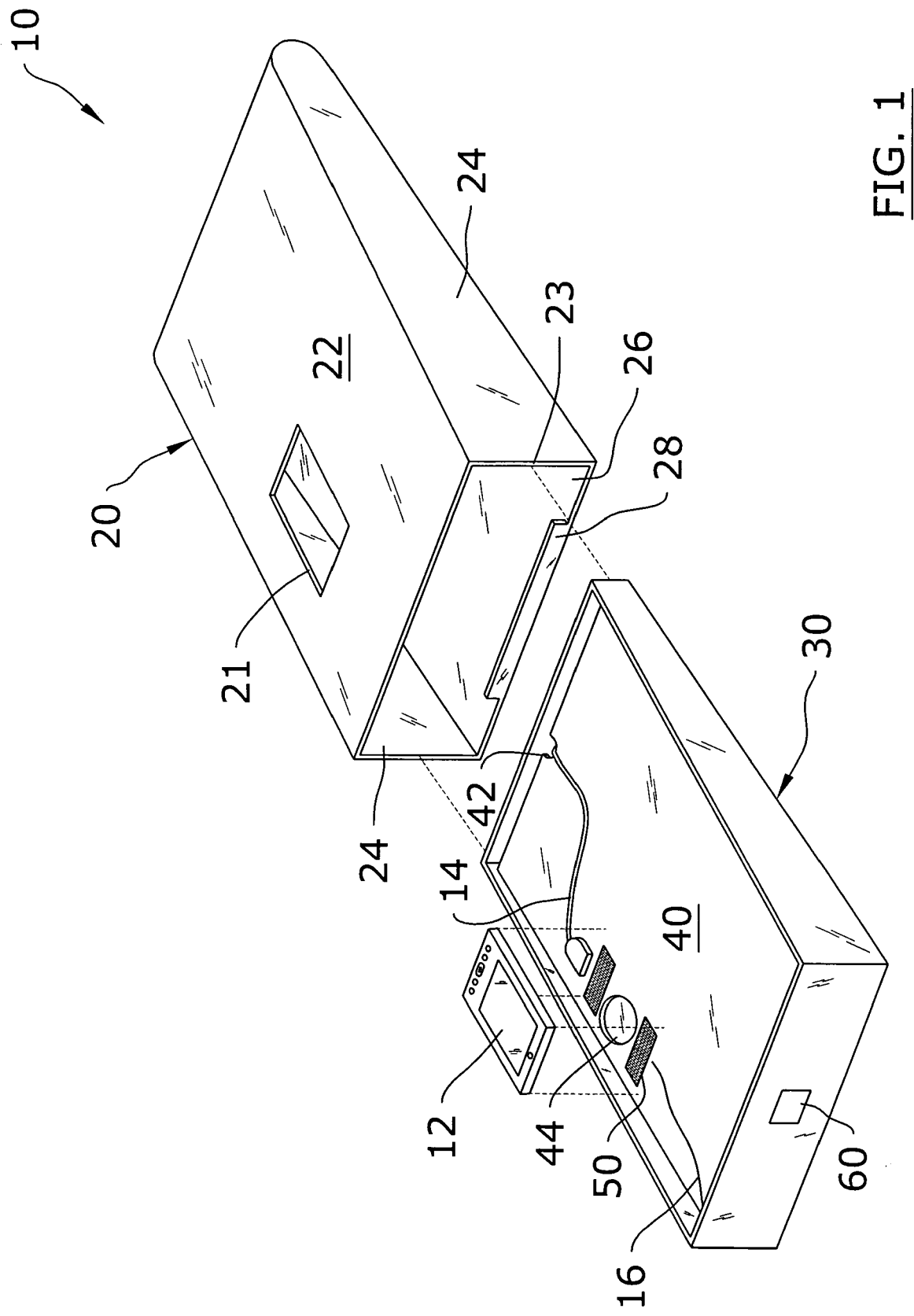
FIG. 1 is an exploded upper perspective view of the present invention.

Turning now descriptively to the drawings, in which similar reference characters denote similar elements throughout the several views, FIGS. 1 through 7 illustrate a personal digital assistant protection system 10, which comprises a housing 20 with an upper opening 21 within an upper surface 22, and a tray 30 removably positionable within the housing 20. The tray 30 includes a support member 40 that supports a PDA 12 in a manner aligned with the upper opening 21 when the tray 30 is positioned within the housing 20. An auxiliary power source 18 and other items may positioned within the tray 30.

B. Housing

As shown in FIGS. 1 through 4 of the drawings, the housing 20 is comprised of a generally broad structure. The housing 20 includes an upper surface 22 that may be utilized to write upon. The upper surface 22 is preferably substantially flat. The upper surface 22 may have various sizes and shapes, however it is desirable for the upper surface 22 to have a shape and size sufficient to support a conventional writing tablet and other papers frequently used in the medical industry.

Figure 2:
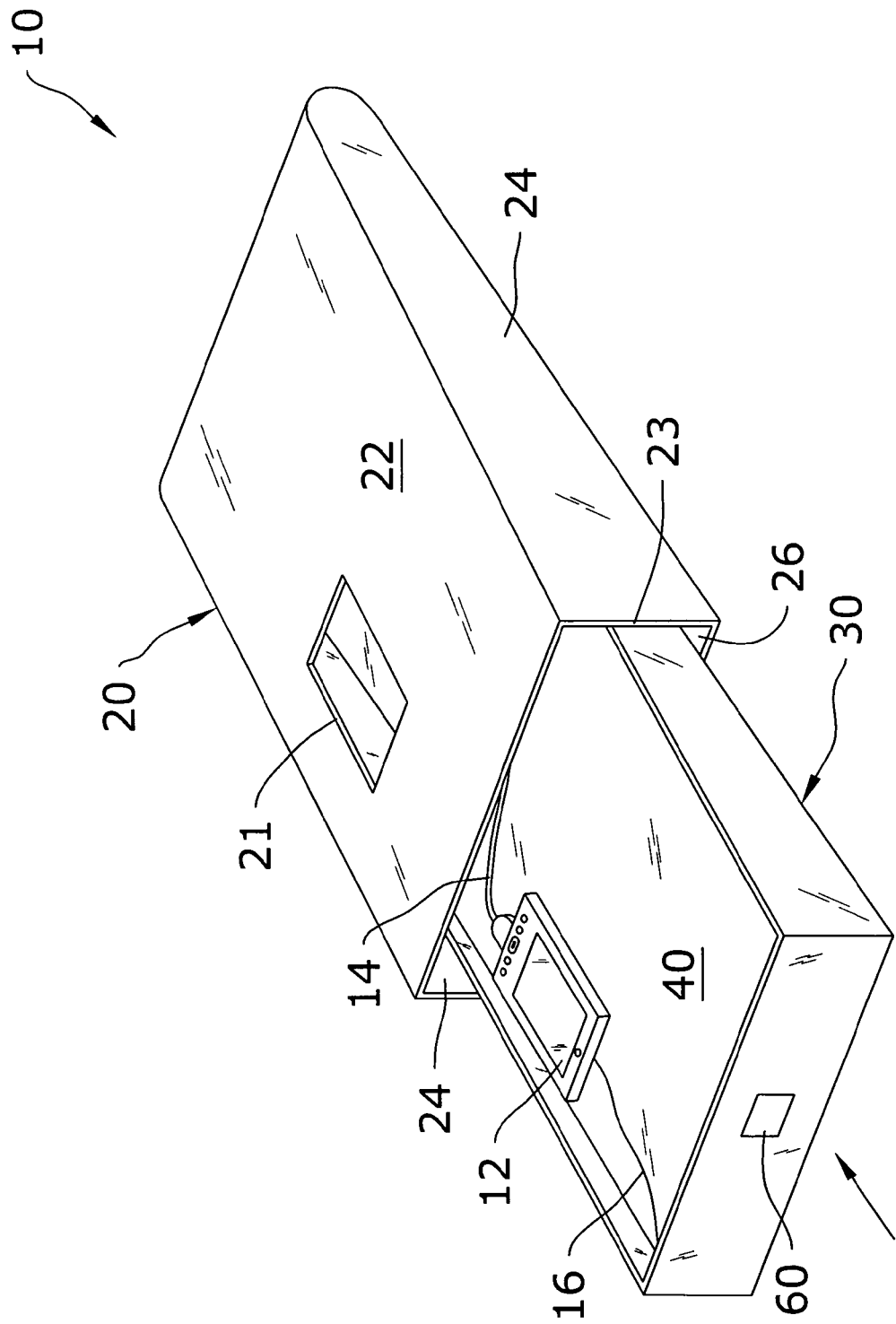
FIG. 2 is an upper perspective view of the present invention with the tray being pushed into the housing.
Figure 3:
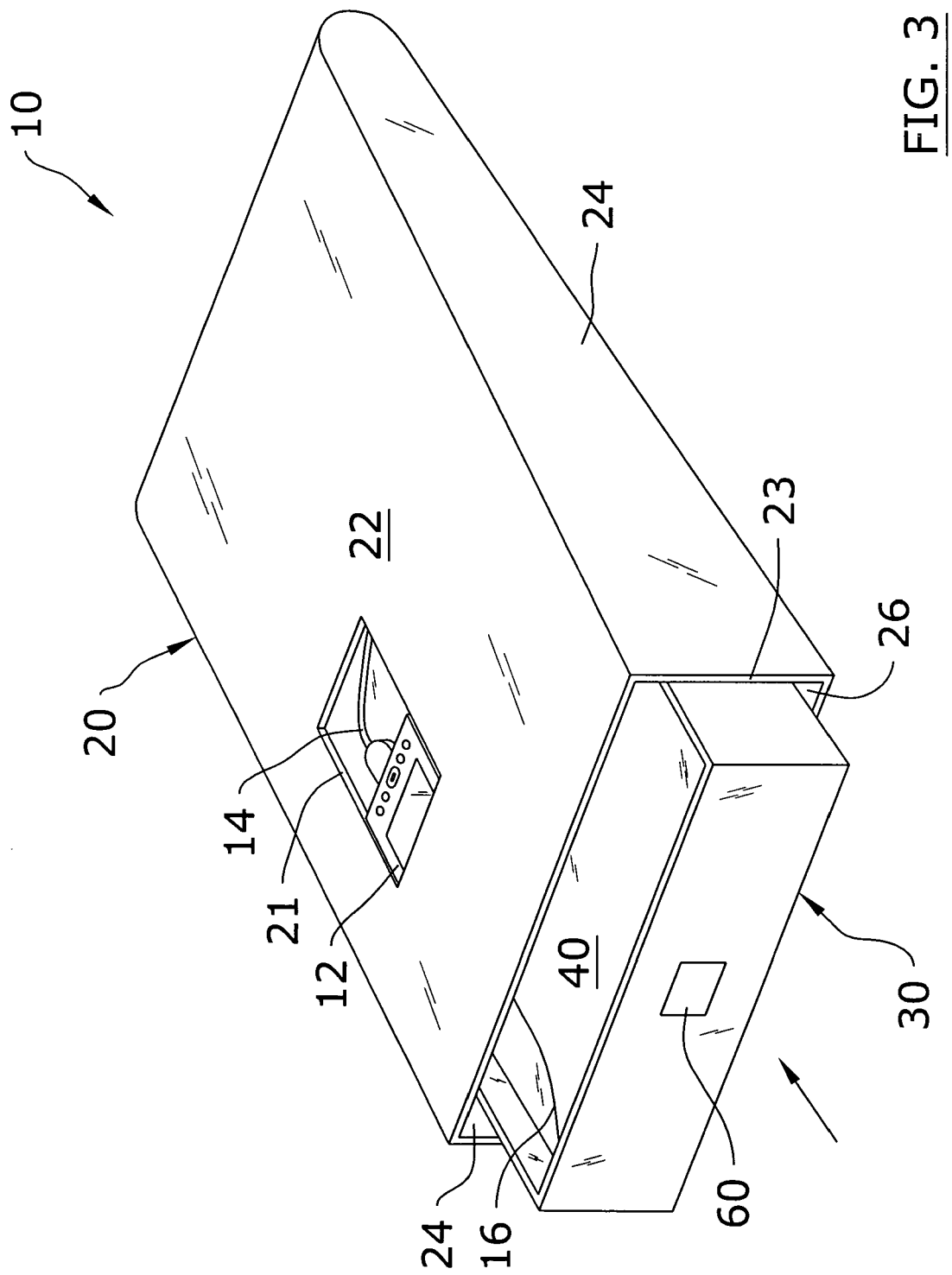
FIG. 3 is an upper perspective view of the present invention with the tray being pushed into the housing.

The housing 20 includes an end opening 23 exposing a receiving cavity 29 as shown in FIG. 1 of the drawings. The end opening 23 is sufficient in size and shape for receiving the tray 30 as shown in FIGS. 2 through 4 of the drawings.

Figure 4:
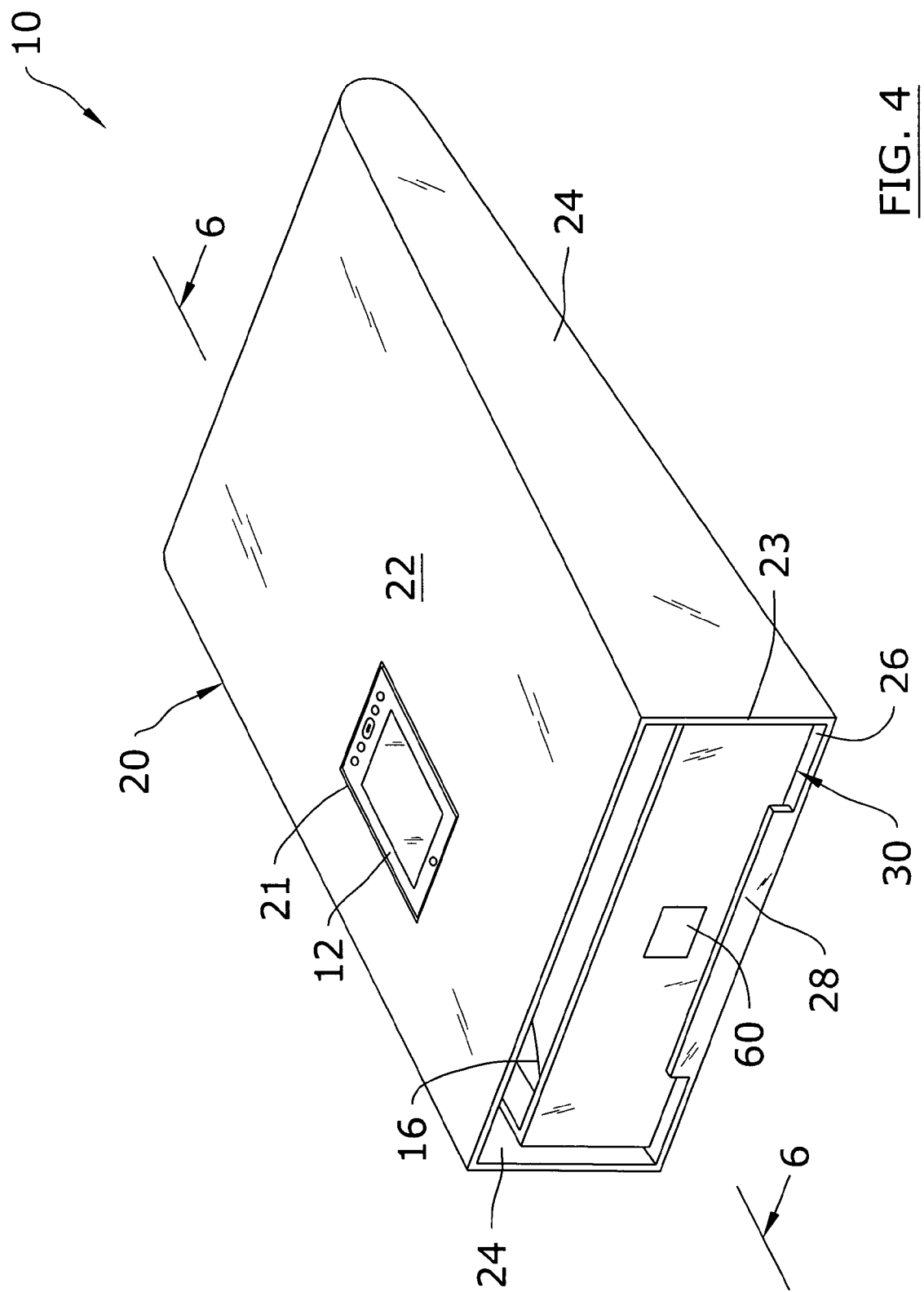
FIG. 4 is an upper perspective view of the present invention with the tray fully positioned in the housing.

The housing 20 further includes an upper opening 21 within the upper surface 22 as shown in FIGS. 1 through 4 of the drawings. The upper opening 21 is sufficient in size and shape for allowing viewing and access to a PDA 12 positioned on the tray 30 within the housing 20 as shown in FIG. 4 of the drawings. The upper opening 21 desirably has a rectangular shape which is a common shape for PDAs 12, however other shapes may be used depending upon the PDA 12 utilized.

Figure 6:
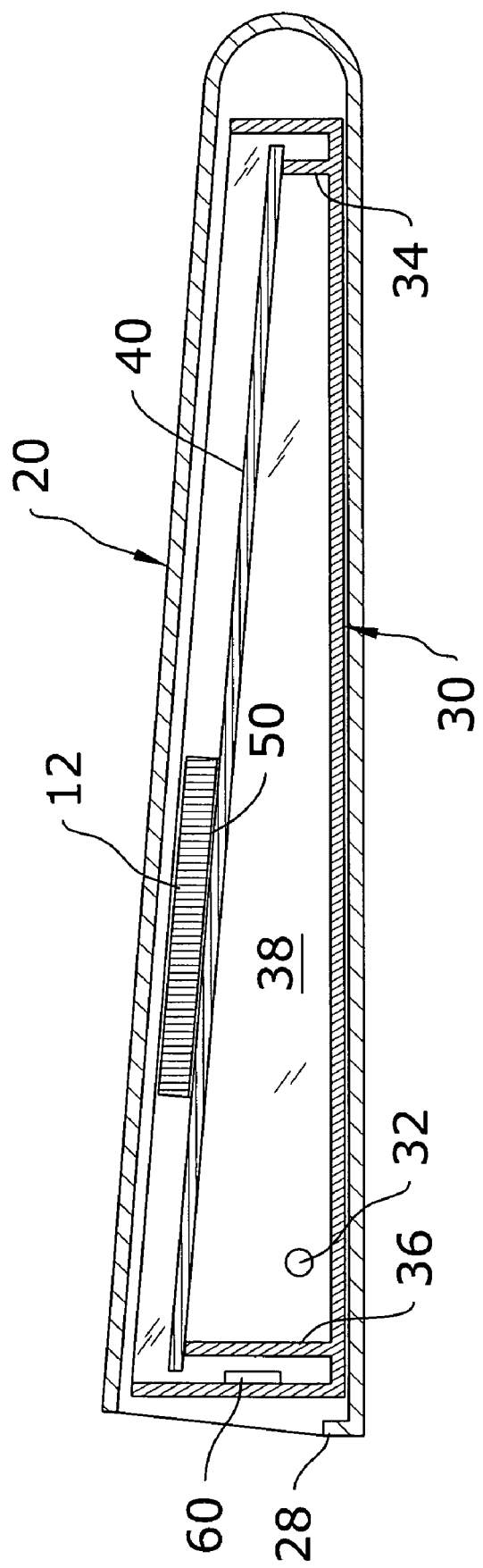
FIG. 6 is a cross sectional view taken along line 6—6 of FIG. 4.
Figure 7:
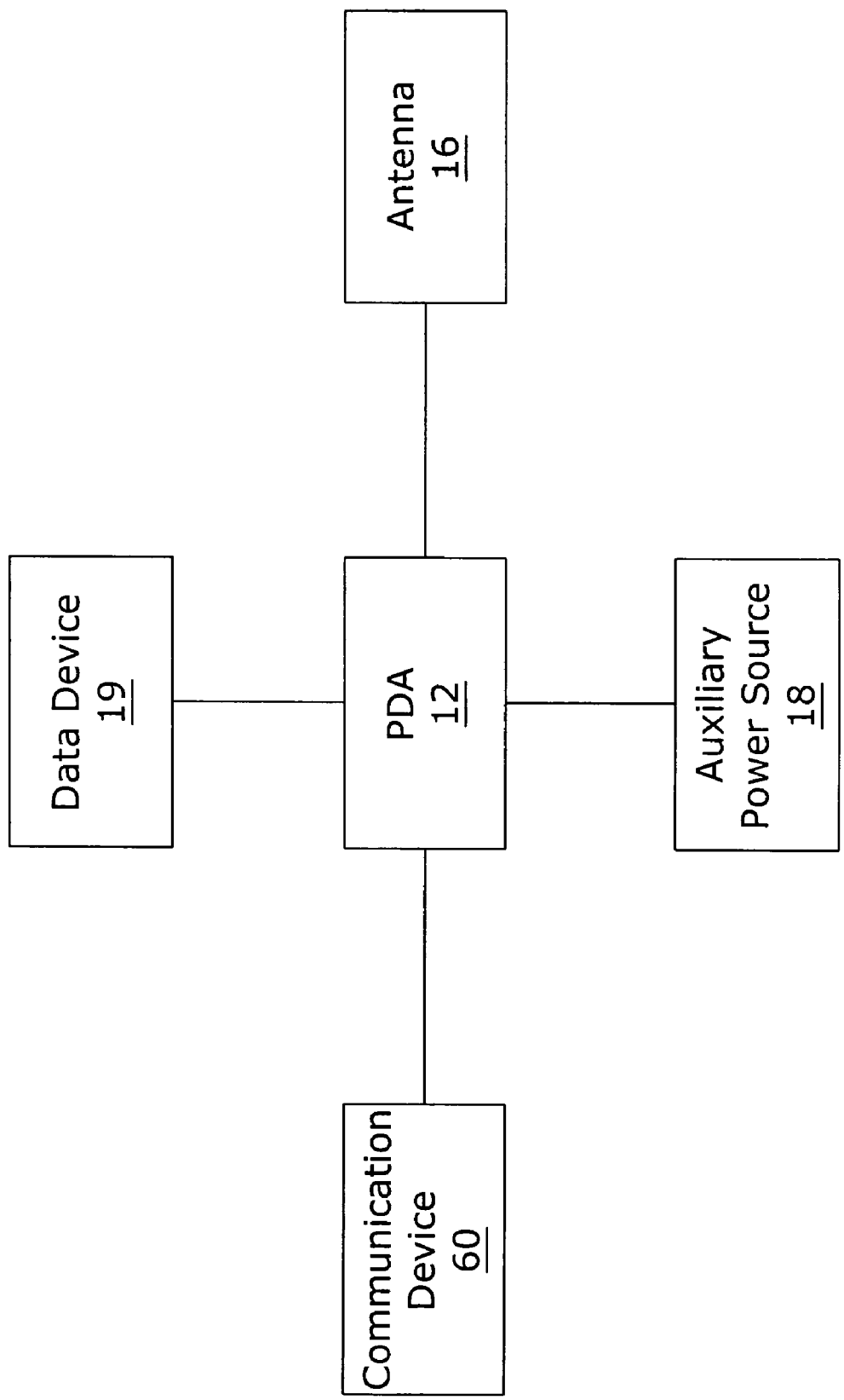
FIG. 7 is a block diagram of an exemplary PDA system as used with the present invention.

The housing 20 is preferably comprised of a tapered structure tapering from the end opening 23 to an opposite end as shown in FIGS. 1 through 4 and 6 of the drawings. The upper surface 22 is preferably angled when the housing 20 is positioned upon a level surface as shown in FIG. 6 of the drawings.

The housing 20 includes a pair of sidewalls 24 and a floor 26 attached between the sidewalls 24 to form the receiving cavity 29 with the upper surface 22 as shown in FIGS. 1 through 4 and 6 of the drawings. A catch lip 28 extends upwardly from the floor 26 adjacent the end opening 23 for catchably retaining the tray 30 within the receiving cavity 29 of the housing 20 as shown in FIGS. 1 and 4 of the drawings. The catch lip 28 has a height sufficient to retain the tray 30 within the housing 20 while allowing removal of the tray 30 from the housing 20 through the end opening 23 by lifting the tray 30 over the catch lip 28.

C. Tray

The tray 30 includes a support member 40 that is capable of supporting the PDA 12 in a manner substantially aligned with the upper opening 21 when the tray 30 is removably positioned within the housing 20 as shown in FIGS. 1, 2 and 4 of the drawings. The tray 30 is removably positionable within the housing 20 through the end opening 23 of the housing 20 as shown in FIGS. 1 through 3 of the drawings. The tray 30 is catchably retained within the housing 20 by the catch lip 28 as shown in FIG. 4 of the drawings.

Figure 5:
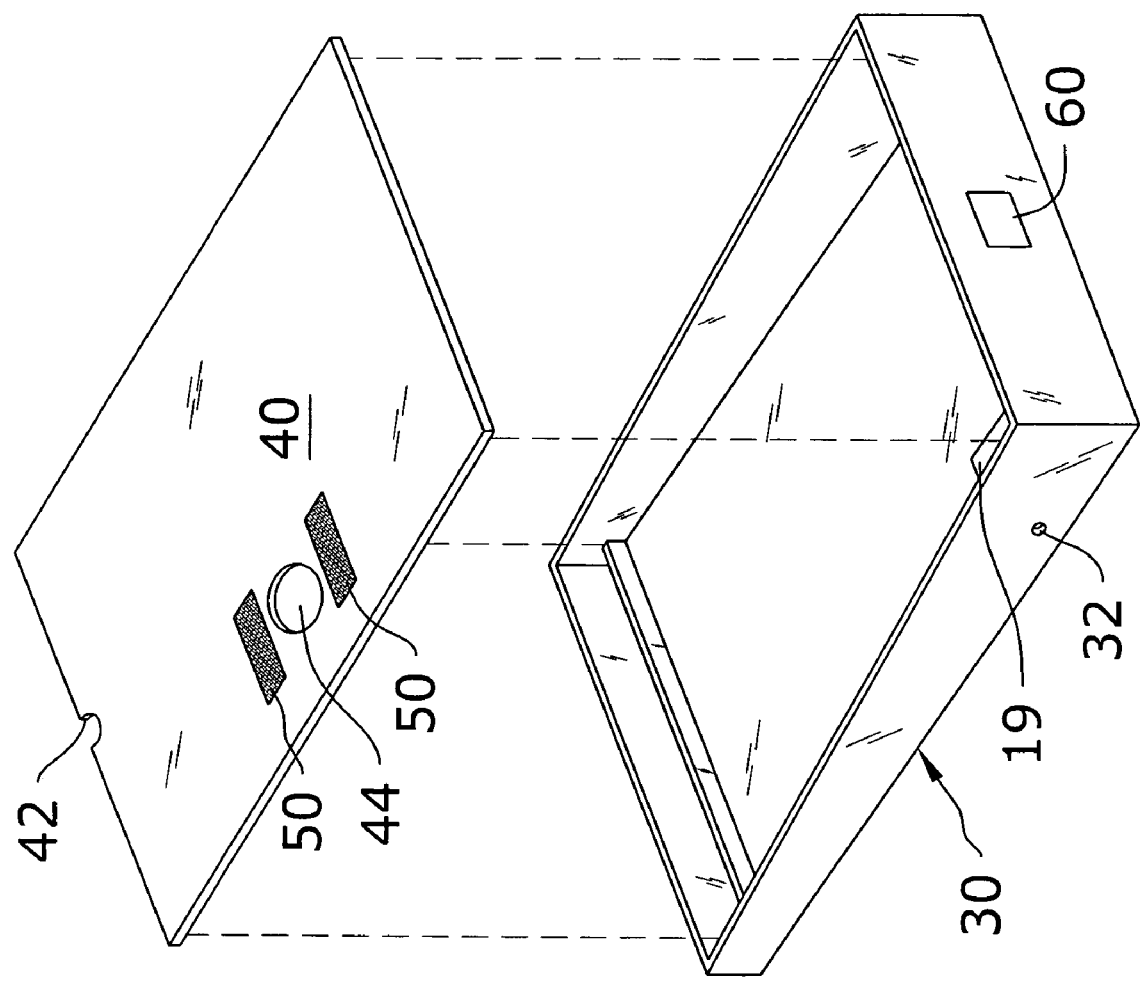
FIG. 5 is an exploded upper perspective view of the tray.

The tray 30 preferably includes a first support 34 near a first end of the tray 30 and a second support 36 near a second end of the tray 30 for supporting the support member 40 as shown in FIGS. 5 and 6 of the drawings. The support member 40 is removably positioned upon the first support 34 and the second support 36 as best illustrated in FIG. 5 of the drawings. The tray 30 includes a storage cavity 38 beneath the support member 40 that is accessed by removing the support member 40 as shown in FIG. 5 of the drawings.

The support member 40 preferably includes a cutout 42 at an end for allowing a power cord 14 to pass through from the PDA 12 to an auxiliary power source 18 within the storage cavity 38 of the tray 30. A sound hole 44 is also preferably positioned within the support member 40 beneath the location of the PDA 12 for allowing sound emitted from the speaker of the PDA 12 to travel through the support member 40 as shown in FIG. 1 of the drawings.

One or more fasteners 50 are attached to the support member 40 and attachable to a back surface of the PDA 12 for removably securing the PDA 12 to the support member 40 as shown in FIG. 1 of the drawings. The one or more fasteners 50 are preferably comprised of a hook and loop fastener material, though other fastener devices may be utilized.

D. Data Device

An aperture 32 extends within the tray 30 as shown in FIG. 5 of the drawings. A data device 19 is positioned within the tray 30 near the aperture 32 for receiving a data connector. The data connector (e.g. plug) extends through the aperture 32 and into a data port of the data device 19. The data device 19 is capable of communicating with the PDA 12 either directly through wire, wireless or other communication means.

E. Auxiliary Power Source

An auxiliary power source 18 is preferably positioned within the storage cavity 38 of the tray 30. The auxiliary power source 18 is electrically connectable to the PDA 12 for providing electrical power to the PDA 12. The auxiliary power source 18 is preferably comprised of a rechargeable battery or similar power source. The auxiliary power source 18 is preferably sufficient for providing electrical power to a wireless PDA 12 for extended periods of time such as 8 hours.

F. Antenna

An antenna 16 is preferably provided that is connectable to the PDA 12 for increasing the wireless communications between the PDA 12 and a wireless network within a building. The antenna 16 is preferably attached to the support member 40 or positioned within the support member 40.

G. Communication Device

A communication device 60 is preferably attached within the tray 30 and capable of communicating with the PDA 12 as shown in FIGS. 1 through 4 of the drawings. The communication device 60 may comprised of an infrared transceiver or similar communication device 60. The communication device 60 allows for the transfer of data between the PDA 12 and an external device (e.g. computer).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

We claim:

1. A personal digital assistant protection system, comprising:
    a housing including an upper surface, an end opening exposing a receiving cavity, and an upper opening within said upper surface, wherein said upper opening is sufficient in size to allow for viewing and access to a PDA; and
    a tray including a support member that is capable of supporting the PDA in a manner substantially aligned with said upper opening when said tray is removably positioned within said housing, wherein said tray is positionable within said housing through said end opening.

2. The personal digital assistant protection system of claim 1, including an auxiliary power source positioned within said tray and electrically connectable to the PDA.

3. The personal digital assistant protection system of claim 1, including an antenna connectable to the PDA.

4. The personal digital assistant protection system of claim 1, including a communication device attached within said tray and capable of communicating with the PDA.

5. The personal digital assistant protection system of claim 1, wherein said support member includes a sound hole positioned beneath the location of the PDA for allowing sound emitted from the speaker of the PDA to travel through said support member.

6. The personal digital assistant protection system of claim 1, including one or more fasteners attached to said support member and attachable to a back surface of the PDA for removably securing the PDA to the support member.

7. The personal digital assistant protection system of claim 1, wherein said housing is comprised of a tapered structure tapering from said end opening to an opposite end.

8. The personal digital assistant protection system of claim 1, wherein said upper surface is substantially flat.

9. The personal digital assistant protection system of claim 1, wherein said housing includes a pair of sidewalls and a floor attached between the sidewalls to form said receiving cavity with said upper surface.

10. The personal digital assistant protection system of claim 1, wherein said tray includes an aperture and a data device within said tray near said aperture for receiving a data connector and wherein said data device is capable of communicating with the PDA.

11. The personal digital assistant protection system of claim 1, wherein said tray includes a storage cavity beneath said support member.

12. The personal digital assistant protection system of claim 1, wherein said tray includes a first support near a first end of said tray and a second support near a second end of said tray for supporting said support member.

13. The personal digital assistant protection system of claim 1, wherein said support member includes a cutout for allowing a power cord to pass through from the PDA to an auxiliary power source within said tray.

14. The personal digital assistant protection system of claim 3, wherein said antenna is attached to said support member.

15. The personal digital assistant protection system of claim 4, wherein said communication device is comprised of an infrared transceiver.

16. The personal digital assistant protection system of claim 6, wherein said one or more fasteners are comprised of a hook and loop fastener material.

17. The personal digital assistant protection system of claim 9, including a catch lip extending upwardly from said floor adjacent said end opening.

18. The personal digital assistant protection system of claim 12, wherein said support member is removably positioned upon said first support and said second support.

19. The personal digital assistant protection system of claim 18, wherein said tray includes a storage cavity beneath said support member.

20. A personal digital assistant protection system, comprising:
    a housing including an upper surface, an end opening exposing a receiving cavity, and an upper opening within said upper surface, wherein said upper opening is sufficient in size to allow for viewing and access to a PDA;
    wherein said housing is comprised of a tapered structure tapering from said end opening to an opposite end;
    wherein said upper surface is substantially flat;
    wherein said housing includes a pair of sidewalls and a floor attached between the sidewalls to form said receiving cavity with said upper surface;
    a catch lip extending upwardly from said floor adjacent said end opening;
    a tray including a support member that is capable of supporting the PDA in a manner substantially aligned with said upper opening when said tray is removably positioned within said housing, wherein said tray is positionable within said housing through said end opening;
    wherein said tray includes a first support near a first end of said tray and a second support near a second end of said tray for supporting said support member, wherein said support member is removably positioned upon said first support and said second support, and wherein said tray includes a storage cavity beneath said support member;
    wherein said support member includes a cutout for allowing a power cord to pass through from the PDA to an auxiliary power source within said tray;
    an aperture within said tray and a data device within said tray near said aperture for receiving a data connector and wherein said data device is capable of communicating with the PDA;
    an auxiliary power source positioned within said tray and electrically connectable to the PDA;
    an antenna connectable to the PDA, wherein said antenna is attached to said support member;
    a communication device attached within said tray and capable of communicating with the PDA, wherein said communication device is comprised of an infrared transceiver;
    a sound hole within said support member, wherein said sound hole is positioned beneath the location of the PDA for allowing sound emitted from the speaker of the PDA to travel through said support member; and
    one or more fasteners attached to said support member and attachable to a back surface of the PDA for removably securing the PDA to the support member, wherein said one or more fasteners are comprised of a hook and loop fastener material.

* * * * *